United States Patent
Kato et al.

(10) Patent No.: US 12,295,067 B2
(45) Date of Patent: May 6, 2025

(54) WIRELESS COMMUNICATION SYSTEM, WIRELESS COMMUNICATION METHOD, AND NON-TRANSITORY COMPUTER-READABLE MEDIUM

(71) Applicant: TOYOTA JIDOSHA KABUSHIKI KAISHA, Toyota (JP)

(72) Inventors: Takahiro Kato, Toyota (JP); Fumihiro Konno, Suntou-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 354 days.

(21) Appl. No.: 17/949,455

(22) Filed: Sep. 21, 2022

(65) Prior Publication Data

US 2023/0156861 A1   May 18, 2023

(30) Foreign Application Priority Data

Nov. 12, 2021  (JP) .................. 2021-185027

(51) Int. Cl.
*H04W 76/50*  (2018.01)
*H01Q 1/22*  (2006.01)
*H04W 72/56*  (2023.01)

(52) U.S. Cl.
CPC .......... *H04W 76/50* (2018.02); *H01Q 1/2241* (2013.01); *H04W 72/56* (2023.01)

(58) Field of Classification Search
CPC ....... H04W 76/50; H04W 72/56; H04W 4/40; H04W 4/90; H04W 68/005; H04W 76/10; H01Q 1/2241

See application file for complete search history.

(56) References Cited

U.S. PATENT DOCUMENTS

| | | | |
|---|---|---|---|
| 7,200,409 B1 * | 4/2007 | Ichikawa | G08B 25/016 455/556.1 |
| 9,432,828 B1 * | 8/2016 | Tu | H04M 1/72421 |
| 2002/0197955 A1 * | 12/2002 | Witkowski | G06K 7/10386 701/472 |
| 2016/0189543 A1 * | 6/2016 | Altintas | H04W 4/46 340/905 |
| 2019/0266878 A1 * | 8/2019 | Nakatsukasa | H04W 4/80 |

FOREIGN PATENT DOCUMENTS

JP   2015-69516 A   4/2015

* cited by examiner

*Primary Examiner* — Dady Chery
(74) *Attorney, Agent, or Firm* — Oliff PLC

(57) ABSTRACT

A wireless communication system including: a memory; a wireless communication unit provided at a vehicle that wirelessly communicates with an external communication device positioned externally to the vehicle; and a processor that is provided at the vehicle and is coupled to the memory, the processor being configured to: cause the wireless communication unit to notify a communication terminal positioned externally to the vehicle, based on an instruction received from an occupant of the vehicle or based on disaster information received from the external communication device by the wireless communication unit.

11 Claims, 15 Drawing Sheets

FIG.12

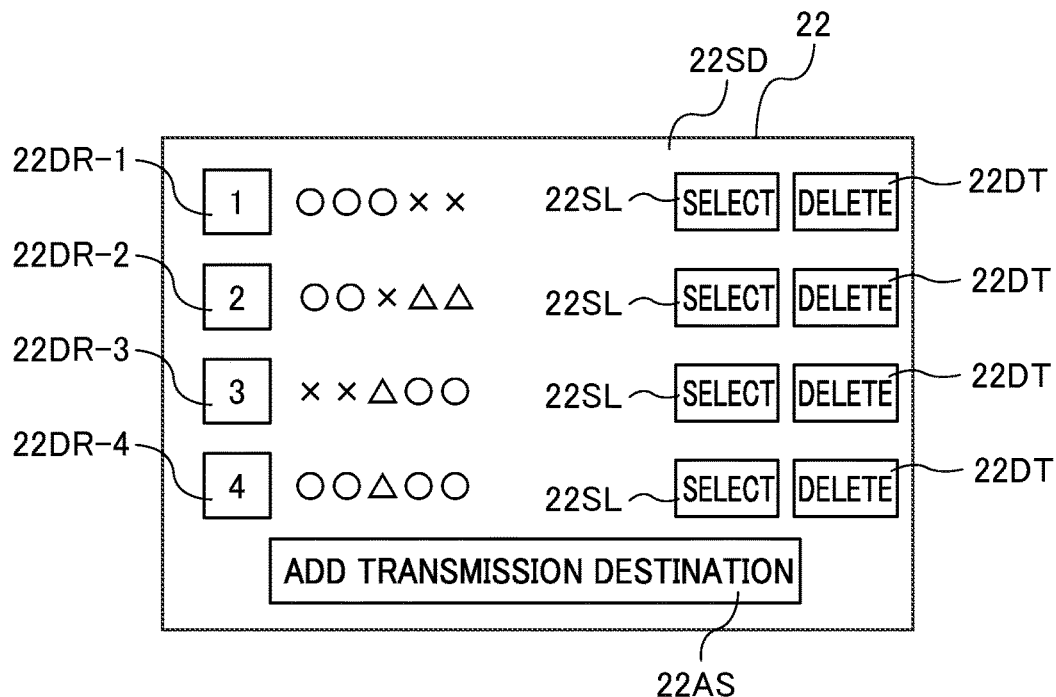

FIG.13

| DISASTER RANK | TYPE OF DISASTER |
|---|---|
| 1 | EARTHQUAKE: SEISMIC INTENSITY 1<br>RAIN: RAINFALL BETWEEN ··· mm AND ··· mm |
| 2 | EARTHQUAKE: SEISMIC INTENSITY 2<br>RAIN: RAINFALL BETWEEN ··· mm AND ··· mm |
| 3 | EARTHQUAKE: SEISMIC INTENSITY 3<br>RAIN: RAINFALL BETWEEN ··· mm AND ··· mm |
| 4 | EARTHQUAKE: SEISMIC INTENSITY 4<br>RAIN: RAINFALL BETWEEN ··· mm AND ··· mm |
| 5 | EARTHQUAKE: SEISMIC INTENSITY 5 OR ABOVE<br>RAIN: RAINFALL··· mm OR ABOVE | great# WIRELESS COMMUNICATION SYSTEM, WIRELESS COMMUNICATION METHOD, AND NON-TRANSITORY COMPUTER-READABLE MEDIUM

CROSS-REFERENCE TO RELATED APPLICATION

This application claims priority under 35 USC 119 from Japanese Patent Application No. 2021-185027, filed on Nov. 12, 2021, the disclosure of which is incorporated by reference herein.

BACKGROUND

Technical Field

The present disclosure relates to a wireless communication system, a wireless communication method, and a non-transitory computer-readable medium storing a program.

Related Art

Japanese Patent Application Laid-Open (JP-A) No. 2015-69516 discloses an invention in which plural onboard terminals and plural mobile terminals are utilized to configure a safety information transmission system (communication network) in a case in which a communication infrastructure of an area where a vehicle is positioned has failed.

In a case in which an occupant of a vehicle in JP-A No. 2015-69516 does not possess a mobile terminal, the occupant is unable to notify a communication terminal positioned externally to the vehicle of their safety information.

SUMMARY

The present disclosure provides a wireless communication system, a wireless communication method, and a non-transitory computer-readable medium storing a program that may enable a vehicle occupant who does not possess a mobile terminal to notify a communication terminal positioned externally to the vehicle.

A first aspect of the present disclosure is a wireless communication system including: a memory; a wireless communication unit provided at a vehicle that wirelessly communicates with an external communication device positioned externally to the vehicle; and a processor that is provided at the vehicle and is coupled to the memory, the processor being configured to: cause the wireless communication unit to notify a communication terminal positioned externally to the vehicle, based on an instruction received from an occupant of the vehicle or based on disaster information received from the external communication device by the wireless communication unit.

In the wireless communication system according to the first aspect, the processor controls the wireless communication unit so as to notify the communication terminal positioned externally to the vehicle based on the instruction received from the occupant, or on the disaster information received from the external communication device by the wireless communication unit. Thus, in a case in which a disaster has occurred, the wireless communication unit of the vehicle notifies the communication terminal positioned externally to the vehicle based on the instruction by the occupant or on the disaster information received by the wireless communication unit. Thus, the wireless communication system of the first aspect may enable an occupant of the vehicle who does not possess a mobile terminal to notify the communication terminal positioned externally to the vehicle.

A second aspect of the present disclosure, in the first aspect, may further include: a detection device that detects whether the occupant is present inside the vehicle, wherein the processor may be configured to cause the wireless communication unit to notify the communication terminal, in a case in which a determination is made that all occupants have exited the vehicle based on a detection result of the detection device and the wireless communication unit has received the disaster information from the external communication device.

In the second aspect of the present disclosure, the wireless communication unit notifies the communication terminal in a case in which the processor determines that all the occupants have exited the vehicle based on the detection result of the detection device, and also the wireless communication unit has received the disaster information from the external communication device. Thus, for example, even in a case in which the occupants are incapable of making rational decisions after a disaster has occurred and have not issued the instruction to the processor, the wireless communication unit notifies the communication terminal after all the occupants have moved out of the vehicle. This may reduce the risk of the notification not being sent from the vehicle to the communication terminal.

A third aspect of the present disclosure is the second aspect, the processor may be configured to cause the wireless communication unit to notify the communication terminal in a case in which a disaster rank of a disaster indicated by the disaster information transmitted by the external communication device to the wireless communication unit is a predetermined rank or above.

In the third aspect of the present disclosure, the wireless communication unit notifies the communication terminal in a case in which the disaster rank of the disaster indicated by the disaster information transmitted by the external communication device to the wireless communication unit is the predetermined rank or above. Thus, the wireless communication unit may not notify the communication terminal in a case in which a disaster ranked below the predetermined rank has occurred.

A fourth aspect of the present disclosure, in any one of the above aspects, may further include at least one sensor provided at the vehicle, wherein the processor may be configured to cause the wireless communication unit to transmit sensor information acquired by the sensor to the communication terminal when notifying the communication terminal.

In the fourth aspect of the present disclosure, the wireless communication unit transmits the sensor information acquired by the sensor provided to the vehicle to the communication terminal when the wireless communication unit is notifying the communication terminal. This may enable a user of the communication terminal to ascertain the sensor information for the vehicle.

A fifth aspect of the present disclosure is the fourth aspect, the sensor may include an air pressure sensor configured to detect an air pressure of a tire of the vehicle.

In the fifth aspect of the present disclosure, the sensor information includes information relating to the air pressure of the vehicle tire. This may enable a user of the communication terminal to ascertain the state of the vehicle tire.

A sixth aspect of the present disclosure is the fourth aspect or the fifth aspect, the sensor may include a camera that images at least one imaging subject out of an imaging subject positioned inside the vehicle or an imaging subject positioned externally to the vehicle.

In the sixth aspect of the present disclosure, the sensor information includes at least one type of image information acquired by the camera out of image information regarding the imaging subject positioned inside the vehicle or image information regarding the imaging subject positioned externally to the vehicle. This may enable a user of the communication terminal to ascertain at least one type of image information out of vehicle interior image information or vehicle exterior image information.

A seventh aspect of the present disclosure is any one of the above aspects, the vehicle may include an operation device enabling the occupant to input information indicating the instruction.

In the seventh aspect of the present disclosure, the occupant may notify the communication terminal using the wireless communication unit by issuing the instruction to the processor through the operation device provided to the vehicle.

An eighth aspect of the present disclosure is the seventh aspect, the operation device may be a switch provided at a steering wheel of the vehicle; and the processor may be configured to control the wireless communication unit to notify to the communication terminal in a case in which the switch has been operated.

In the eighth aspect of the present disclosure, the notification is sent from the wireless communication unit to the communication terminal when the occupant has operated the switch provided to the steering wheel. This may enable the occupant to easily execute the operation to make the wireless communication unit notify the communication terminal while performing driving operations of the vehicle.

A ninth aspect of the present disclosure is a wireless communication method, including, by a processor provided at a vehicle: causing a wireless communication unit provided at the vehicle to send a notification to a communication terminal positioned externally to the vehicle, based on an instruction received from an occupant of the vehicle or based on disaster information received from an external communication device positioned externally to the vehicle by the wireless communication unit.

A tenth aspect of the present disclosure is a non-transitory computer-readable medium storing a program executable by a processor provided at a vehicle to execute processing including: causing a wireless communication unit provided at the vehicle to notify a communication terminal positioned externally to the vehicle, based on an instruction received from an occupant of the vehicle or based on disaster information received from an external communication device positioned externally to the vehicle by the wireless communication unit.

In the above aspects, the wireless communication system, the wireless communication method, and the non-transitory computer-readable medium storing a program of the present disclosure may enable a vehicle occupant who does not possess a mobile terminal to notify the communication terminal positioned externally to the vehicle.

BRIEF DESCRIPTION OF THE DRAWINGS

Exemplary embodiments will be described in detail based on the following figures, wherein:

FIG. 12 is a diagram illustrating a display when an enter button has been touch-operated;

FIG. 13 is a diagram illustrating a rank determination map;

DETAILED DESCRIPTION

Explanation follows regarding an exemplary embodiment of a wireless communication system, a wireless communication method, and a program according to the present disclosure, with reference to the drawings.

Figure 1:
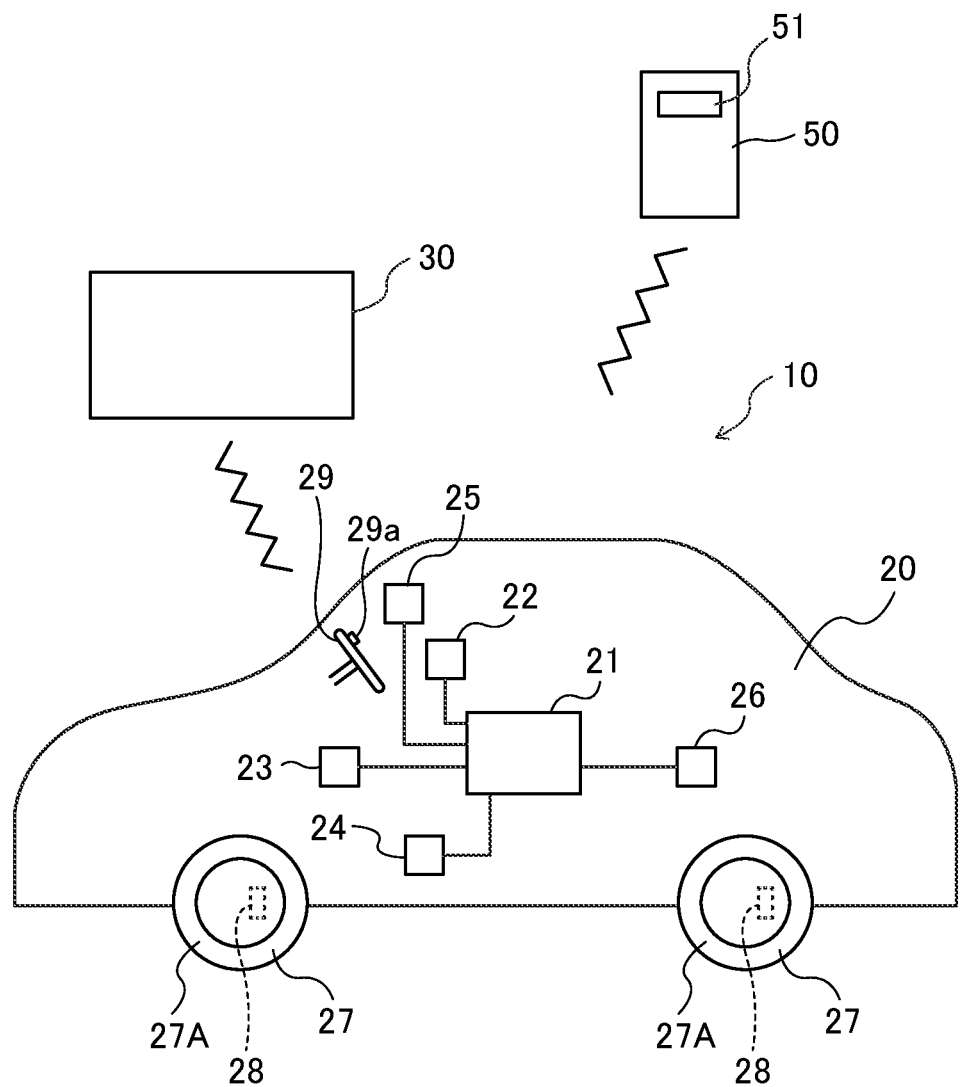
FIG. 1 is a diagram illustrating a wireless communication system according to an exemplary embodiment.

As illustrated in FIG. 1, a wireless communication system 10 according to the present exemplary embodiment includes a vehicle 20, an external server (external communication device) 30, and plural communication terminals 50 positioned externally to the vehicle 20. Note that only a single communication terminal 50 is illustrated in FIG. 1 for simplicity. Furthermore, plural occupants (not illustrated in the drawings) are present inside the vehicle 20.

The vehicle 20 is capable of performing data communication with the external server 30 over a network (such as the internet). As illustrated in FIG. 1, the vehicle 20 includes an electronic control unit (ECU) 21, a display (operation device) 22 including a touch panel, a speaker 23, a first camera (detection device; sensor) 24, a second camera (sensor) 25, a global positioning system (GPS) receiver 26, four vehicle wheels 27, air pressure sensors (sensors) 28, and a steering wheel 29.

The display 22 is provided to an instrument panel (not illustrated in the drawings) and is capable of displaying various images. The speaker 23 is capable of outputting various audio.

The first camera 24 is capable of imaging any imaging subjects positioned inside the vehicle 20. Namely, the first camera 24 is capable of imaging the occupants positioned inside the vehicle 20. Image data acquired by the first camera 24 is hereafter referred to as "vehicle interior image data". The second camera 25 is capable of imaging any imaging subjects positioned externally to the vehicle 20 (in the surroundings). Image data acquired by the second camera 25 is hereafter referred to as "vehicle exterior image data". The GPS receiver 26 acquires information relating to the position where the vehicle 20 is traveling (hereafter referred to as "position information") by receiving GPS signals transmitted by GPS satellites. The first camera 24 transmits the acquired vehicle interior image data to the ECU 21 whenever a predetermined duration has elapsed. The second camera 25 transmits the acquired vehicle exterior image data to the ECU 21 whenever a predetermined duration has elapsed. The GPS receiver 26 transmits the acquired position information to the ECU 21 whenever a predetermined duration has elapsed. The vehicle interior image data and the vehicle exterior image data transmitted to the ECU 21 are associated with the position information and time information and sequentially recorded in storage 21D of the ECU 21, described later.

The four vehicle wheels 27 each include a tire 27A. Each of the tires 27A is a hollow annular member made of an elastic material, and air is filled into a space inside the tire 27A. Note that the two vehicle wheels 27 configuring left and right front wheels are steered wheels. The air pressure sensors 28 provided to each of the vehicle wheels 27 periodically measure the air pressure of the corresponding tire 27A at predetermined intervals. The respective air pressure sensors 28 also include a wireless communication function. The respective air pressure sensors 28 periodically transmit information relating to the acquired air pressure together with ID information for the corresponding vehicle wheel 27 to the ECU 21 (to a wireless communication I/F 21E) at predetermined intervals.

The steering wheel 29 is rotatably supported by the instrument panel. When the steering wheel 29 is rotation-operated, a steering angle of the left and right steered wheels 27 changes. A push button switch 29a is provided to the steering wheel 29. The switch 29a is can be moved between an initial position illustrated in FIG. 1 and an operation position (not illustrated in the drawings). The switch 29a is positioned at the initial position when no external force is applied to the switch 29a.

Figure 2:
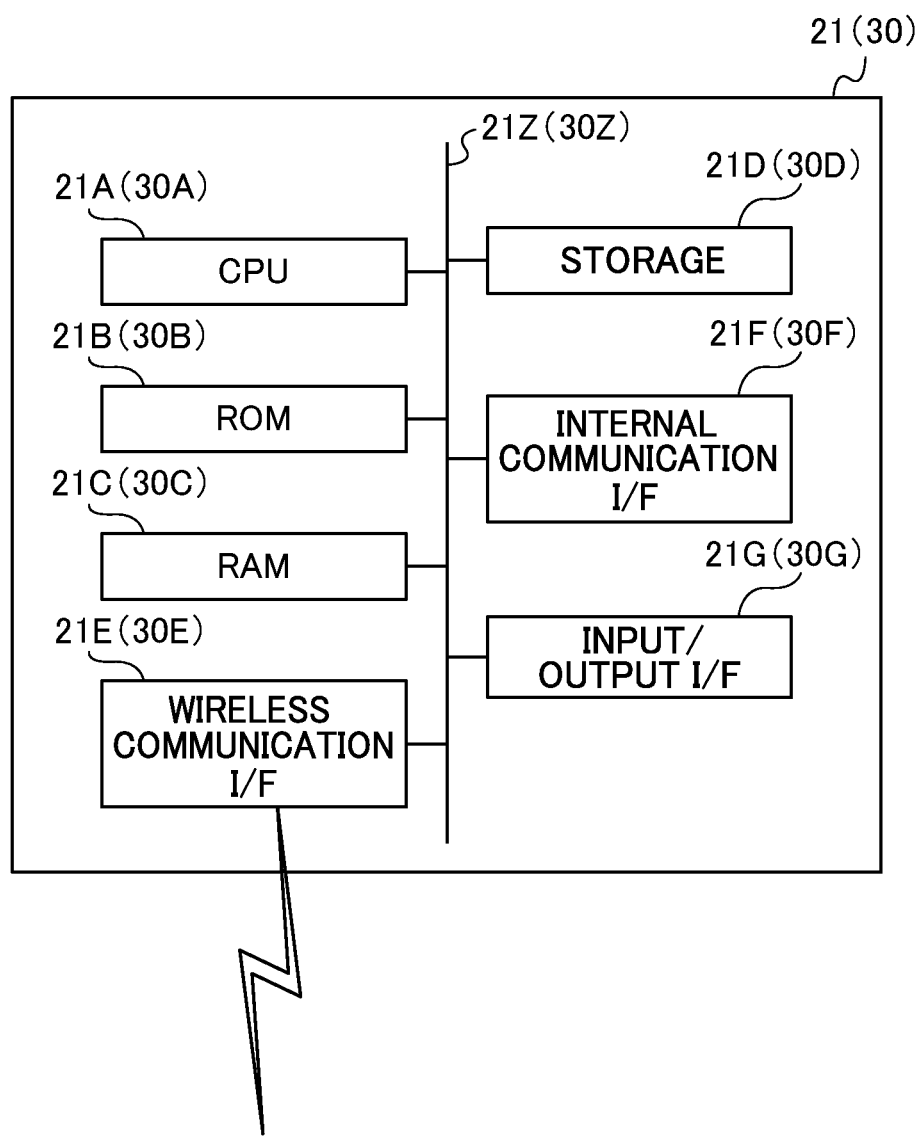
FIG. 2 is a control block diagram of the vehicle ECU and the external server illustrated in FIG. 1.

As illustrated in FIG. 2, the ECU 21 is configured including a central processing unit (CPU; processor) 21A, read only memory (ROM) 21B, random access memory (RAM) 21C, the storage 21D, the wireless communication interface (I/F) (wireless communication unit) 21E, an internal communication I/F 21F, and an input/output I/F 21G. The CPU 21A, the ROM 21B, the RAM 21C, the storage 21D, the wireless communication I/F 21E, the internal communication I/F 21F, and the input/output I/F 21G are connected so as to be capable of communicating with one another through an internal bus 21Z. The ECU 21 is capable of acquiring time-related information from a timer. The display 22, the speaker 23, the first camera 24, the second camera 25, the GPS receiver 26, and the switch 29a are connected to the ECU 21 (input/output I/F 21G).

The CPU 21A is a central processing unit that executes various programs and controls respective sections. The CPU 21A reads a program from the ROM 21B or the storage 21D and executes the program using the RAM 21C as a workspace. The CPU 21A controls the respective configuration elements and performs various arithmetic processing according to the programs recorded in the ROM 21B or the storage 21D.

The ROM 21B holds various programs and various data. For example, plural applications (programs) are installed in the ROM 21B. For example, a notification application, described later, is installed in the ROM 21B. The RAM 21C acts as a workspace to temporarily store programs or data. The storage 21D is configured by a storage device such as a hard disk drive (HDD) or a solid state drive (SSD), and holds various programs and various data. For example, map data for the entire country in which the vehicle 20 is positioned is recorded in the storage 21D.

The wireless communication I/F 21E is an interface for performing wireless communication with various equipment. For example, the wireless communication I/F 21E is capable of wireless communication with the external server 30. Furthermore, the air pressure-related information for the respective tires 27A that has been wirelessly transmitted by the respective air pressure sensors 28 is received by the wireless communication I/F 21E. The wireless communication I/F 21E employs a communication standard such as Bluetooth (registered trademark) or Wi-Fi (registered trademark). The wireless communication I/F 21E is capable of sending and receiving emails.

The internal communication I/F 21F is an interface for connecting to separate ECUs to the ECU 21 provided to the vehicle 20 through an external bus.

The input/output I/F 21G is an interface for communicating with various devices. For example, the input/output I/F 21G is capable of communicating with the display 22, the speaker 23, the first camera 24, the second camera 25, the GPS receiver 26, and the switch 29a.

Figure 3:
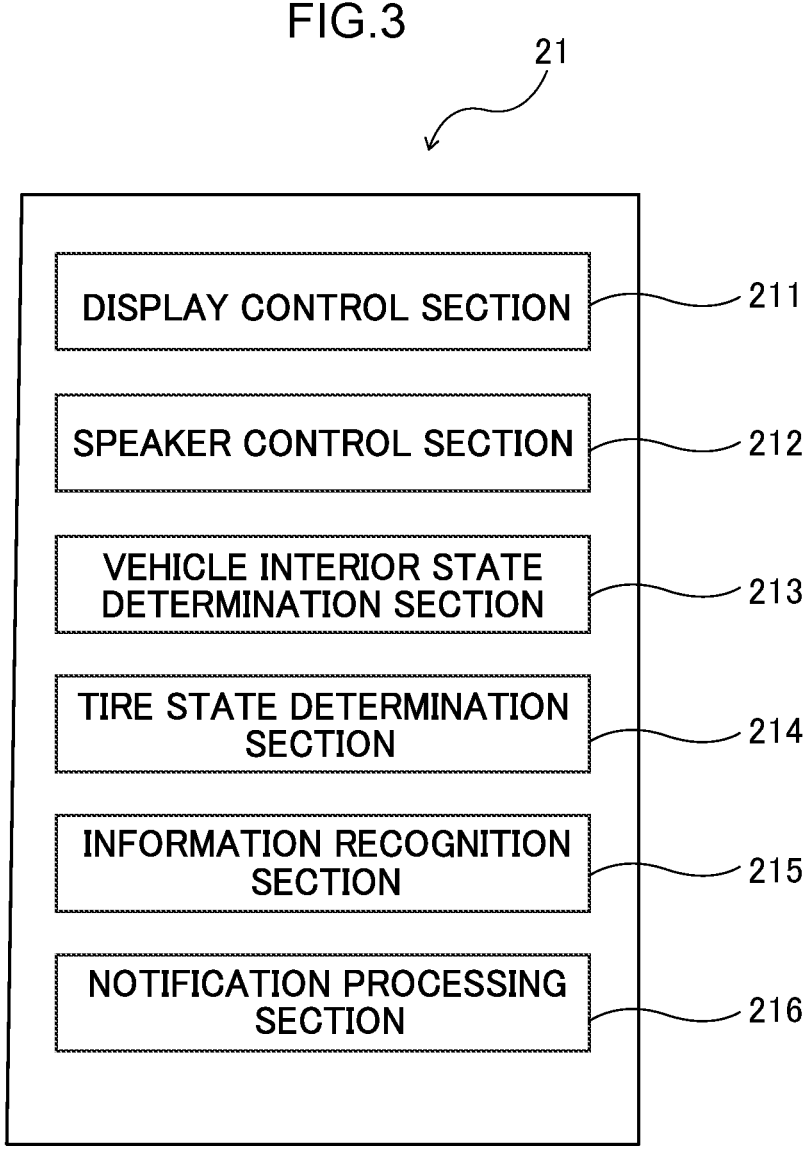
FIG. 3 is a functional block diagram of the ECU illustrated in FIG. 2.

FIG. 3 is a block diagram illustrating an example of functional configuration of the ECU 21. The ECU 21 includes as functional configuration a display control section 211, a speaker control section 212, a vehicle interior state determination section 213, a tire state determination section 214, an information recognition section 215, and a notification processing section 216. The display control section 211, the speaker control section 212, the vehicle interior state determination section 213, the tire state determination section 214, the information recognition section 215, and the notification processing section 216 are implemented by the CPU 21A reading and executing a program stored in the ROM 21B.

Figure 5:
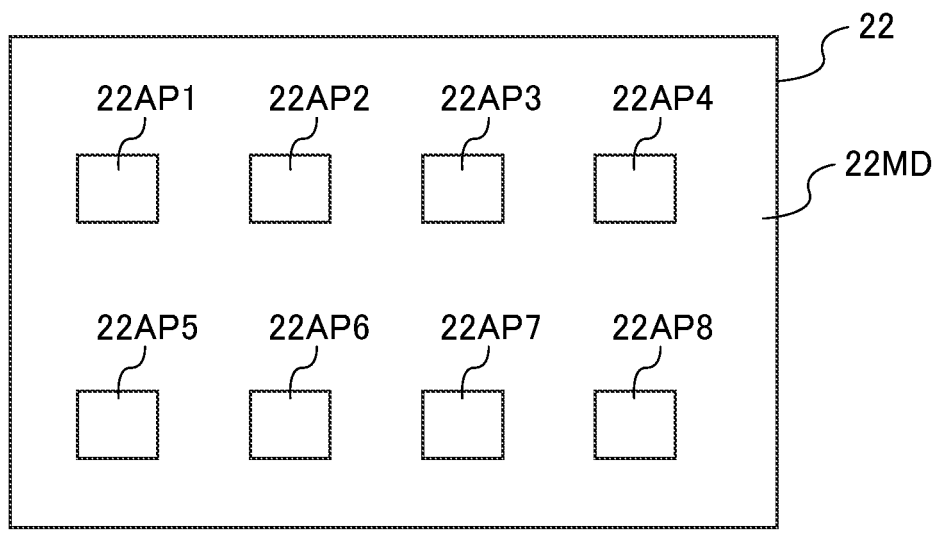
FIG. 5 is a diagram illustrating a main image on a display provided to the vehicle illustrated in FIG. 1.

The display control section 211 controls the display 22. Plural applications (programs) are installed in the ECU 21. Thus, when the display 22 is in an ON state, the display control section 211 is capable of displaying a main image (initial image) 22MD including application images (hereafter referred to as AP images) 22AP1, 22AP2, 22AP3 to 22AP8 representing eight applications on the display 22 as illustrated in FIG. 5. The AP image 22AP1 is an image representing the notification application.

The speaker control section 212 controls the speaker 23.

The vehicle interior state determination section 213 determines whether or not any occupants are present inside the vehicle 20 based on imaging data acquired by the first camera 24.

The tire state determination section 214 determines whether or not the vehicle 20 is in a state capable of travel based on the air pressure-related information for the respective tires 27A received from the respective air pressure sensors 28. For example, in a case in which a determination is made that the air pressure of two or more of the tires 27A is a predetermined threshold or below, the tire state determination section 214 determines that the vehicle 20 is in a "travel-incapacitated state". Hereafter, information relating to whether or not the vehicle 20 is in a state capable of travel based on the air pressure of the tires 27A is referred to as "travel-capability information". The travel-capability information is associated with the position information and time information and recorded in the storage 21D.

When the wireless communication I/F 21E has received disaster information for the area where the vehicle 20 is positioned and information relating to a disaster rank indicating a magnitude of the disaster from the external server 30, the information recognition section 215 recognizes this information. This information recognized by the information recognition section 215 is displayed on the display 22.

The notification processing section 216 implements functionality included in the notification application in a case in which a predetermined touch operation has been performed on the display 22 in a state in which the notification application has been activated. The notification processing section 216 also executes notification processing, described later, in a case in which the switch 29a has been moved to the operation position.

As illustrated in FIG. 2, the external server 30 illustrated in FIG. 1 is configured including as hardware configuration a CPU (processor) 30A, ROM 30B, RAM 30C, storage 30D, a wireless communication I/F 30E, an internal communication I/F 30F, and an input/output I/F 30G. The CPU 30A, the ROM 30B, the RAM 30C, the storage 30D, the wireless communication I/F 30E, the internal communication I/F 30F, and the input/output I/F 30G are connected to communicate with one another through an internal bus 30Z. The external server 30 acquire time-related information from a timer.

Figure 4:
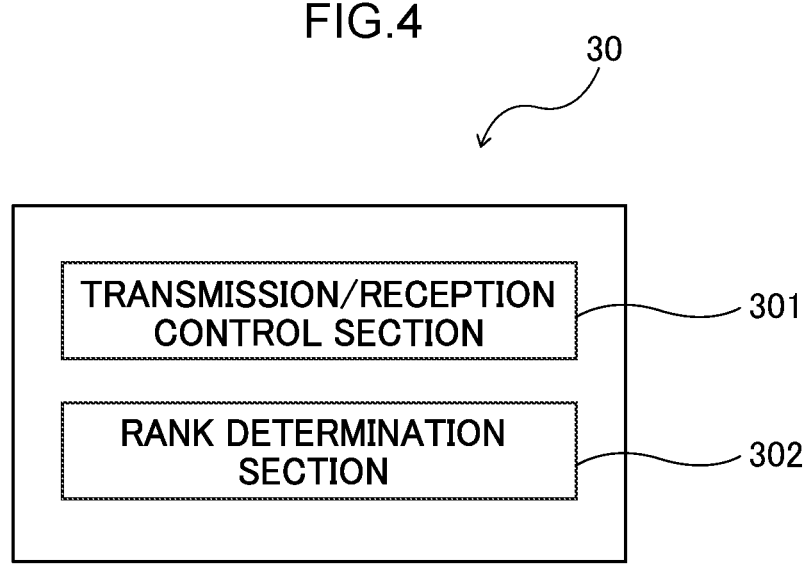
FIG. 4 is a functional block diagram of the external server illustrated in FIG. 1.

FIG. 4 is a block diagram illustrating an example of functional configuration of hardware of the external server 30. The hardware of the external server 30 includes a transmission/reception control section 301 and a rank determination section 302 as functional configuration. The transmission/reception control section 301 and the rank determination section 302 are implemented by the CPU 30A reading and executing a program stored in the ROM 30B.

The transmission/reception control section 301 controls the wireless communication I/F 30E and the internal communication I/F 30F. The wireless communication I/F 30E receives disaster information generated in the corresponding area that has been wirelessly transmitted by a local authority server (not illustrated in the drawings) managed by a local authority for the area in which the vehicle 20 is positioned. In the present exemplary embodiment, examples of disasters include earthquakes, heavy rain, tornadoes, and tsunamis.

The transmission/reception control section 301 determines the disaster rank of the disaster indicated by the received disaster information based on the disaster information that the wireless communication I/F 30E received from the local authority server, and on a rank determination map 31 (see FIG. 13) stored in the ROM 30B. Disaster ranks relating to earthquakes, heavy rain, and so on are specified in the rank determination map 31. Note that although disaster ranks relating to tornadoes, tsunamis, and so on are also specified in the rank determination map 31, this is omitted from FIG. 13 for simplicity. The greater the scale of the disaster, the larger the figure indicating the disaster rank.

The communication terminal 50 illustrated in FIG. 1 is for example a smartphone. A display 51 including a touch panel is provided to the communication terminal 50. The communication terminal 50 includes as hardware configuration a CPU, ROM, RAM, storage, a wireless communication I/F, an internal communication I/F, an input/output I/F, and an internal bus. The communication terminal 50 is capable of transmitting and receiving emails.

Next, explanation follows regarding operation of the present exemplary embodiment.

Figure 15:
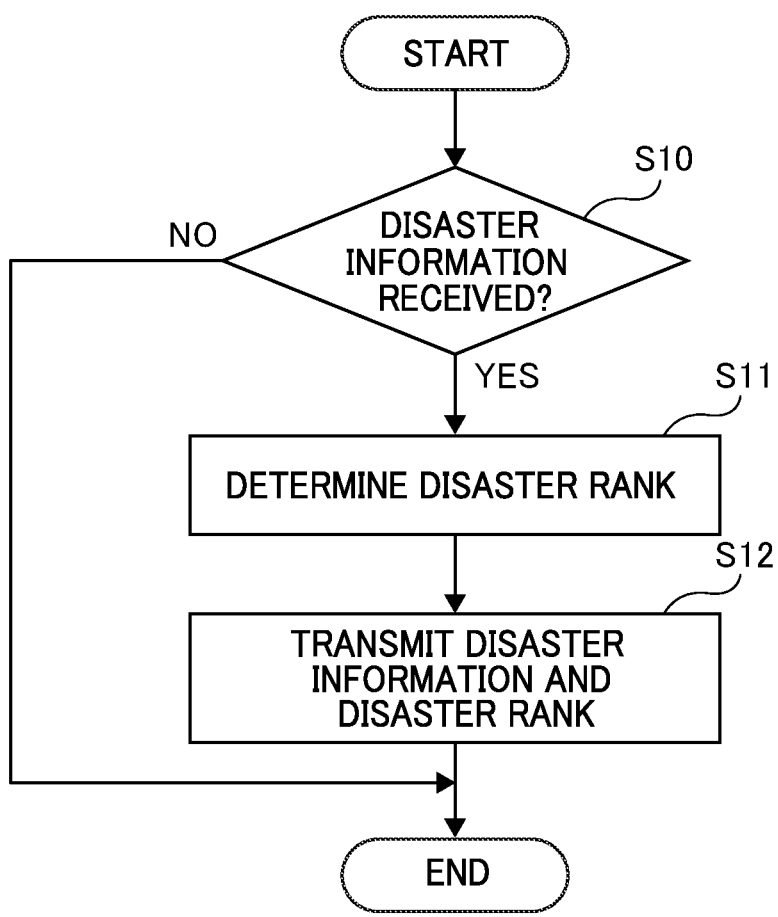
FIG. 15 is a flowchart illustrating processing executed by an external server.

First, explanation follows regarding a flow of processing performed by the external server 30, with reference to the flowchart in FIG. 15. The external server 30 periodically executes the processing of the flowchart in FIG. 15 whenever a predetermined duration has elapsed.

First, at step S10, the transmission/reception control section 301 of the external server 30 determines whether or not the wireless communication I/F 30E has received disaster information relating to the area where the vehicle 20 is positioned from the local authority server.

In a case in which affirmative determination is made at step S10 the external server 30 proceeds to step S11, whereupon the rank determination section 302 determines a disaster rank of the disaster indicated by the received disaster information based on the received disaster information and the rank determination map 31. For example, in a case in which the external server 30 has received disaster information such as "An earthquake with a seismic intensity of 4 has occurred" at step S10, the rank determination section 302 determines that the disaster rank of the disaster indicated by the disaster information is "4".

After finishing the processing of step S11 the external server 30 proceeds to step S12, whereupon the transmission/reception control section 301 causes the wireless communication I/F 30E to wirelessly transmit the received disaster information and the disaster rank-related information to the vehicle 20.

After finishing the processing of step S12 or in a case in which a negative determination is made at step S10, the external server 30 ends the processing of the flowchart in FIG. 15.

Next, explanation follows regarding flows of processing performed by the ECU 21 of the vehicle 20, with reference to the flowcharts in FIG. 16 to FIG. 20. First, explanation follows regarding the flowchart in FIG. 16. The ECU 21 periodically executes the processing of the flowchart in FIG. 16 whenever a predetermined duration has elapsed.

At step S20, the information recognition section 215 of the ECU 21 determines whether or not the wireless communication I/F 21E has received disaster information for the area where the vehicle 20 is positioned and the corresponding disaster rank-related information from the external server 30.

Figure 14:
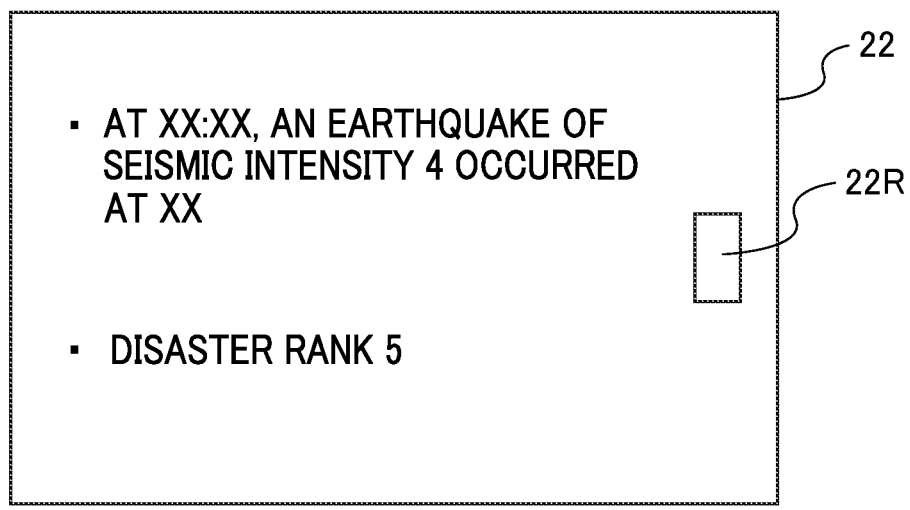
FIG. 14 is a diagram illustrating a display when a vehicle has received disaster information and information indicating a disaster rank from an external server.

In a case in which affirmative determination is made at step S20 the ECU 21 proceeds to step S21, whereupon the display control section 211 displays the disaster information and the disaster rank-related information on the display 22 as illustrated in FIG. 14. Note that when an occupant performs a touch operation on a main image display button 22R illustrated in FIG. 14, the main image 22MD illustrated in FIG. 5 is displayed on the display 22.

Figure 16:
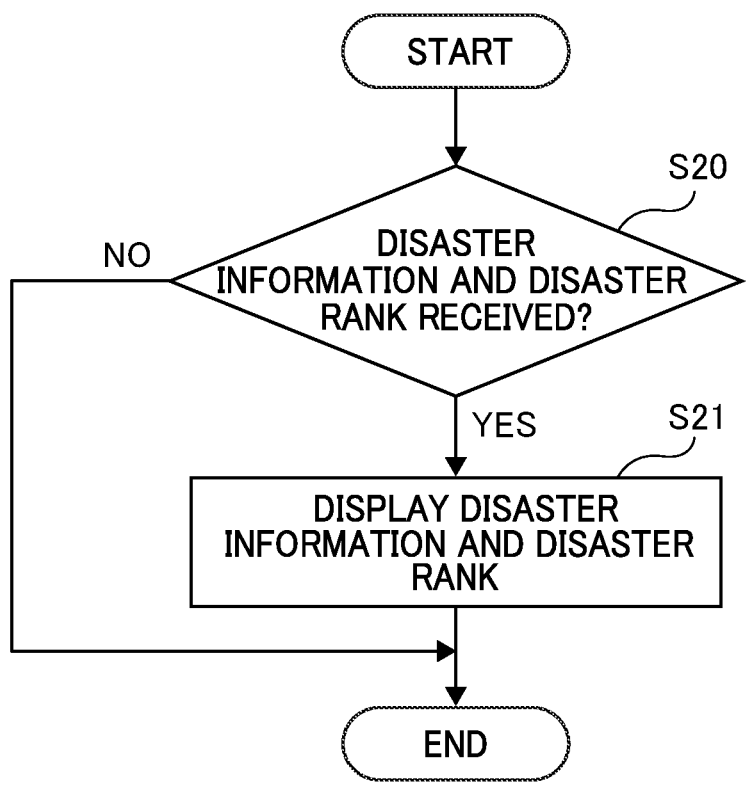
FIG. 16 is a flowchart illustrating processing executed by an ECU.

After finishing the processing of step S21 or in a case in which negative determination is made at step S20, the ECU 21 ends this round of the processing of the flowchart in FIG. 16.

Figure 17:
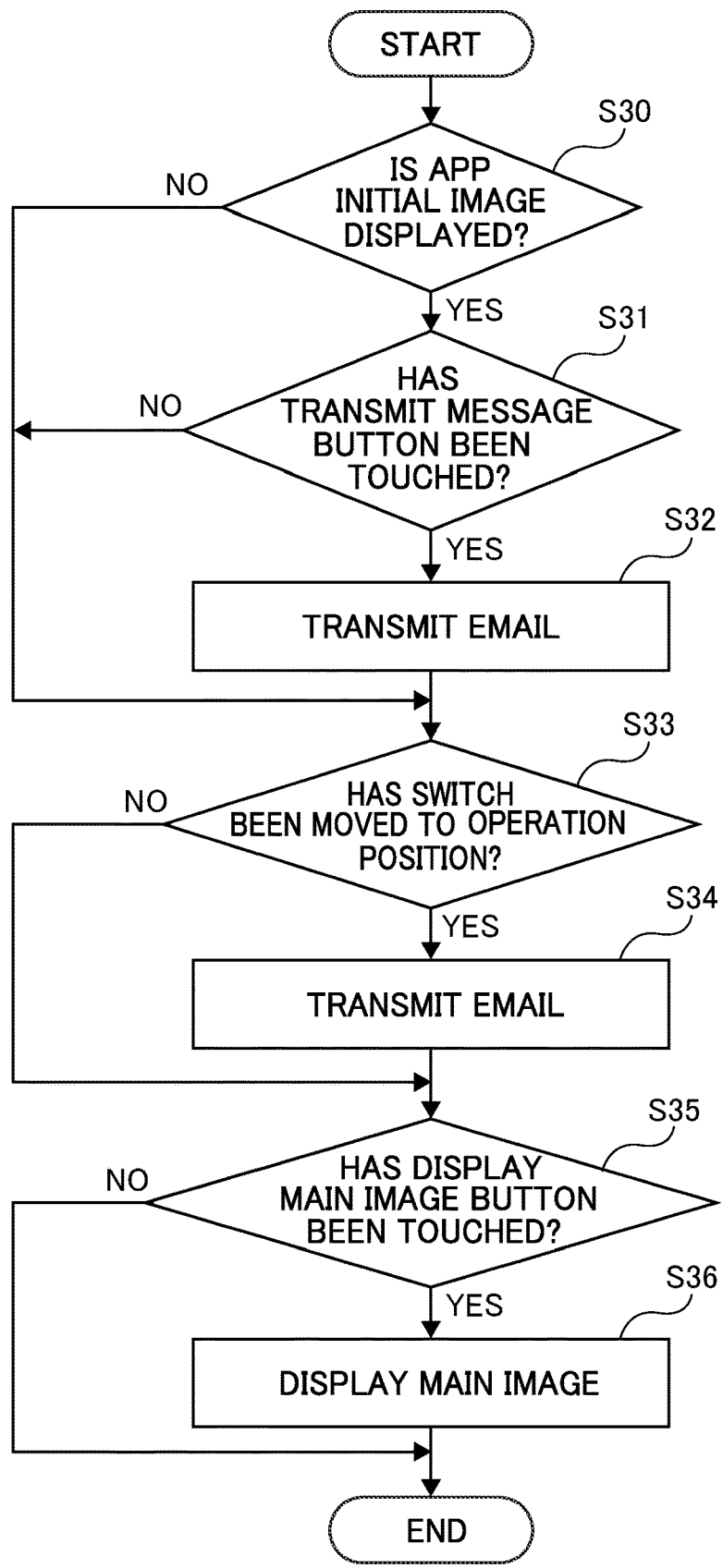
FIG. 17 is a flowchart illustrating processing executed by an ECU.

The ECU 21 also periodically executes the processing of the flowchart in FIG. 17 whenever a predetermined duration has elapsed.

Figure 6:
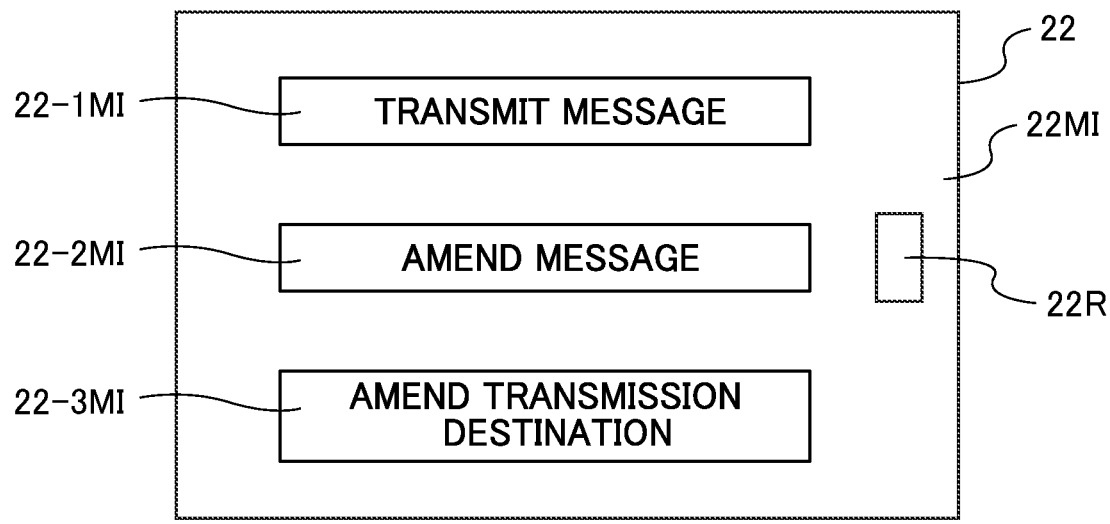
FIG. 6 is a diagram illustrating a display when a notification application has been activated.

At step S30, the notification processing section 216 of the ECU 21 determines whether or not the notification application has been activated and an app initial image 22MI illustrated in FIG. 6 is being displayed on the display 22.

Namely, the notification processing section 216 determines whether or not a touch operation has been performed on the AP image 22AP1 included in the main image 22MD illustrated in FIG. 5. The app initial image 22MI includes a transmit message button 22-1MI, an amend message button 22-2MI, an amend transmission destination button 22-3MI, and a display main image button 22R.

In a case in which affirmative determination is made at step S30 the ECU 21 proceeds to step S31, whereupon the notification processing section 216 determines whether or not a touch operation has been performed on the transmit message button 22-1MI by an occupant of the vehicle 20.

For example, in a case in which an occupant performs a touch operation on the transmit message button 22-1MI having seen the disaster information and the disaster rank-related information displayed on the display 22 during the processing of step S21, the ECU 21 makes affirmative determination at step S31 and proceeds to step S32. At step S32, the wireless communication I/F 21E wirelessly transmits an email to the respective communication terminals 50 under the control of the notification processing section 216. A message, position information for the vehicle 20, as well as the travel-capability information, the vehicle interior image data, and the vehicle exterior image data recorded in the storage 21D are included in this email. Note that the transmitted vehicle interior image data and vehicle exterior image data may be data acquired between a time that is a predetermined time prior to the processing timing of step S32 and this processing timing. For example, vehicle interior image data and vehicle exterior image data acquired between a time one minute prior to the processing timing and this processing timing may be transmitted together with message. The received message, the position information for the vehicle 20, the travel-capability information, an image depicting the vehicle interior image data, and an image depicting the vehicle exterior image data are displayed on the display 51 of each of the communication terminals 50 that received the email from the vehicle 20.

Figure 7:
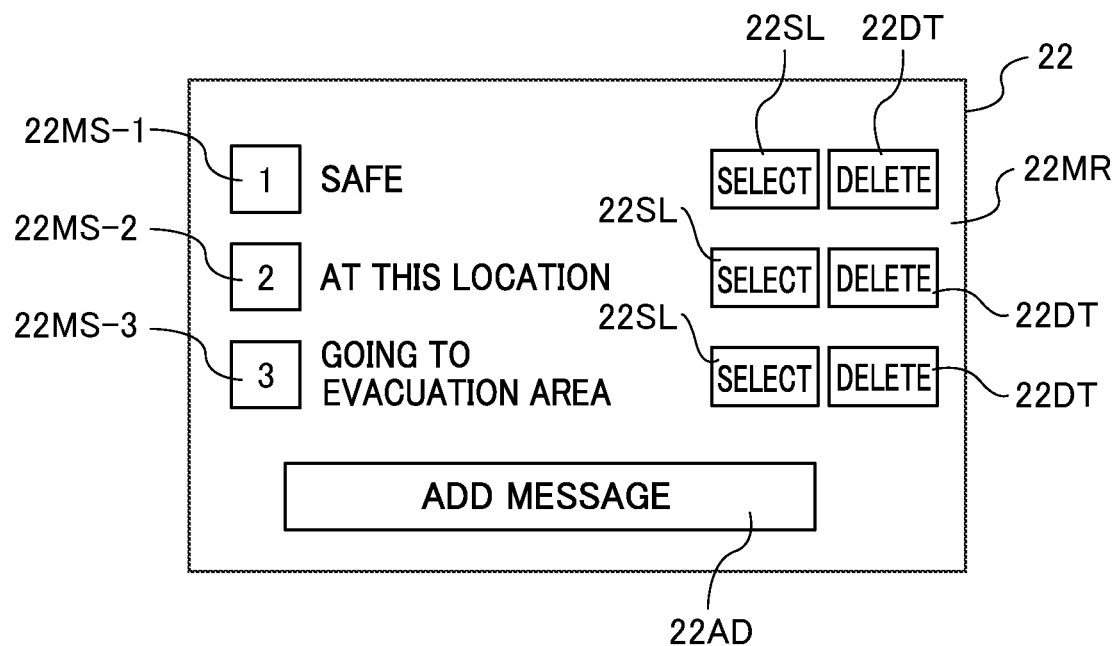
FIG. 7 is a diagram illustrating a display when an amend message button has been touch-operated.

Note that, as illustrated in FIG. 7, plural messages that the vehicle 20 is capable of transmitting to the respective communication terminals 50 are recorded in the storage 21D of the ECU 21. Namely, the vehicle 20 is capable of transmitting a first message 22MS-1, a second message 22MS-2, or a third message 22MS-3 included in an message amendment image 22MR illustrated in FIG. 7 to the respective communication terminals 50. The contents of the first message 22MS-1, the second message 22MS-2, and the third message 22MS-3 are as follows.

Figure 10:
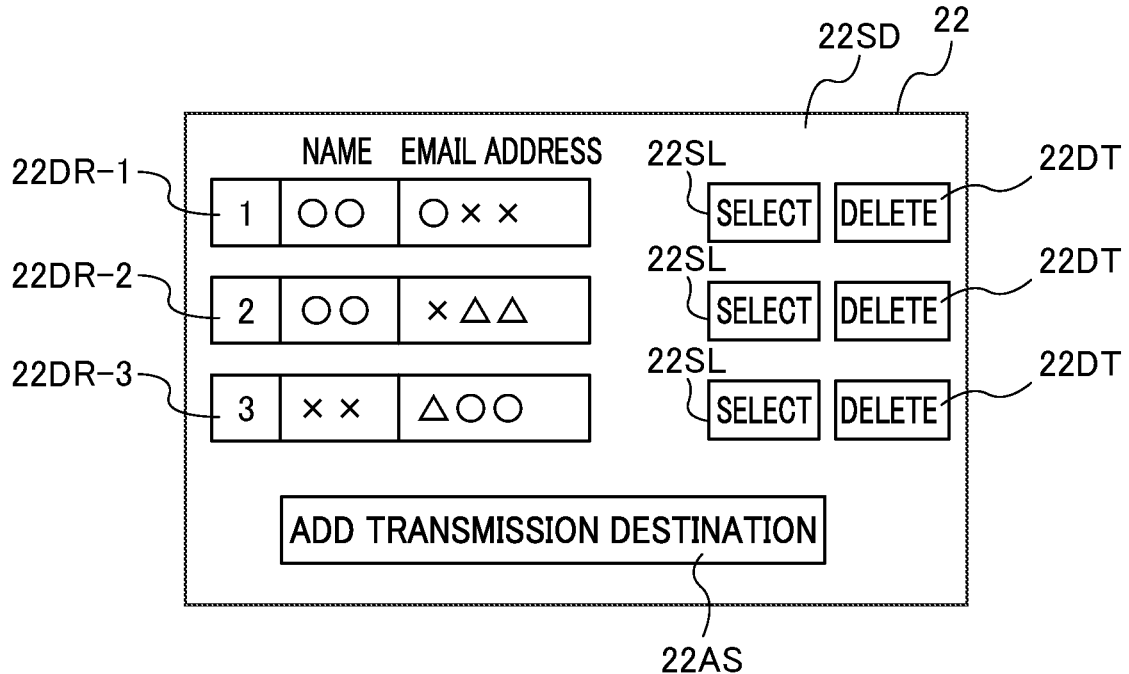
FIG. 10 is a diagram illustrating a display when an amend transmission destination button has been touch-operated.

$1^{st}$ message: safe
$2^{nd}$ message: at this location
$3^{rd}$ message: going to an evacuation area As illustrated in FIG. 10, transmission destination information corresponding to three communication terminals 50 is recorded in the storage 21D of the ECU 21. Namely, first transmission destination information 22DR-1, second transmission destination information 22DR-2, and third transmission destination information 22DR-3 depicts information relating to respective owners (their names) and email addresses of the three communication terminals 50.

When the notification application is in an initial setting state, the first message 22MS-1 is selected (registered) as a transmission target message, and the first transmission destination information 22DR-1 is selected (registered) as target transmission destination information. Thus, in a case in which the processing of step S32 is executed while the application notification is in the initial setting state, the wireless communication I/F 21E transmits an email message stating "We're safe" to the communication terminal 50 corresponding to the first transmission destination information 22DR-1. Note that plural items of transmission destination information may be selected as the target transmission destination information.

In a case in which a negative determination is made at step S30 or step S31, or the processing of step S32 has ended, the ECU 21 proceeds to step S33, whereupon the notification processing section 216 determines whether or not the switch 29a has been moved from the initial position to the operation position.

In a case in which affirmative determination is made at step S33 the ECU 21 proceeds to step S34 and executes the same processing as in step S32.

After finishing the processing of step S34 the ECU 21 proceeds to step S35, and determines whether or not a touch operation has been performed on the display main image button 22R illustrated in FIG. 6.

In a case in which affirmative determination is made at step S35 the ECU 21 proceeds to step S36, whereupon the display control section 211 displays the main image 22MD illustrated in FIG. 5 on the display 22.

After finishing the processing of step S36 or in a case in which a negative determination is made at step S35, the ECU 21 ends this round of the processing of the flowchart in FIG. 17.

Figure 18:
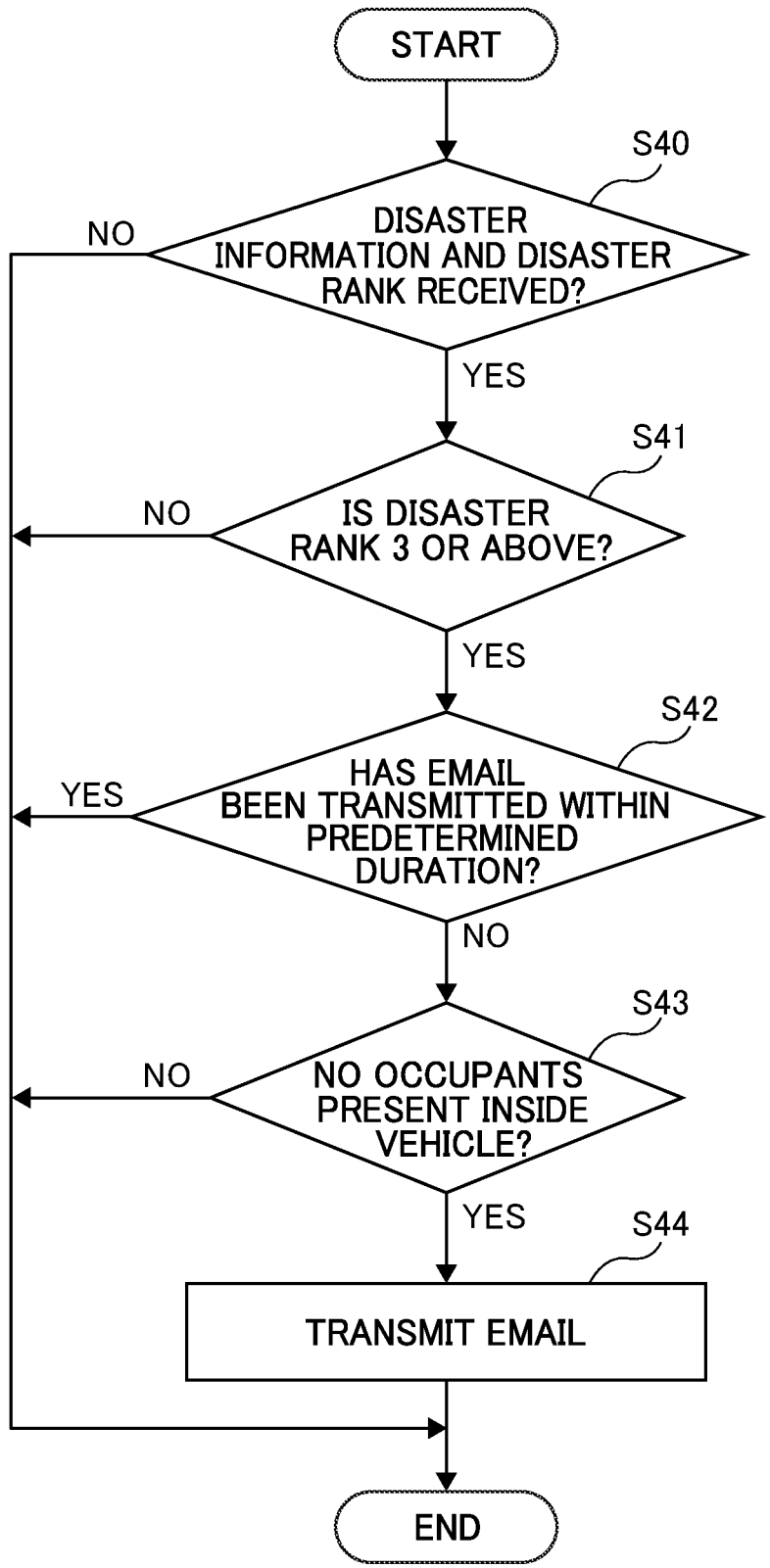
FIG. 18 is a flowchart illustrating processing executed by an ECU.

The ECU 21 also periodically executes the processing of the flowchart in FIG. 18 whenever a predetermined duration has elapsed.

At step S40, the information recognition section 215 of the ECU 21 executes the same processing as at step S20.

In a case in which affirmative determination is made at step S40 the ECU 21 proceeds to step S41, whereupon the information recognition section 215 determines whether or not the received disaster rank is a predetermined rank or above. The predetermined rank may for example be a rank of 3. However, the predetermined rank may be any desired rank of rank 2 or above.

In a case in which affirmative determination is made at step S41 the ECU 21 proceeds to step S42, whereupon the notification processing section 216 determines whether or not the processing of steps S32 and S34 has been executed within a predetermined duration. This predetermined duration may for example be five minutes.

In a case in which a negative determination is made at step S42 the ECU 21 proceeds to step S43, whereupon the notification processing section 216 determines whether or not any occupants are present inside the vehicle 20 based on the vehicle interior image data received from the first camera 24. In other words, the notification processing section 216 determines whether or not all the occupants have moved from inside the vehicle to outside the vehicle.

In a case in which affirmative determination is made at step S43 the ECU 21 proceeds to step S44, whereupon the notification processing section 216 executes the same processing as at step S32. Namely the wireless communication I/F 21E of the vehicle 20 wirelessly transmits the email to the communication terminals 50 without consulting the occupants.

After finishing the processing of step S44, in a case in which a negative determination is made at steps S40, S41, or S43, or in a case in which affirmative determination is made at step S42, the ECU 21 ends this round of the processing of the flowchart in FIG. 18.

Figure 19:
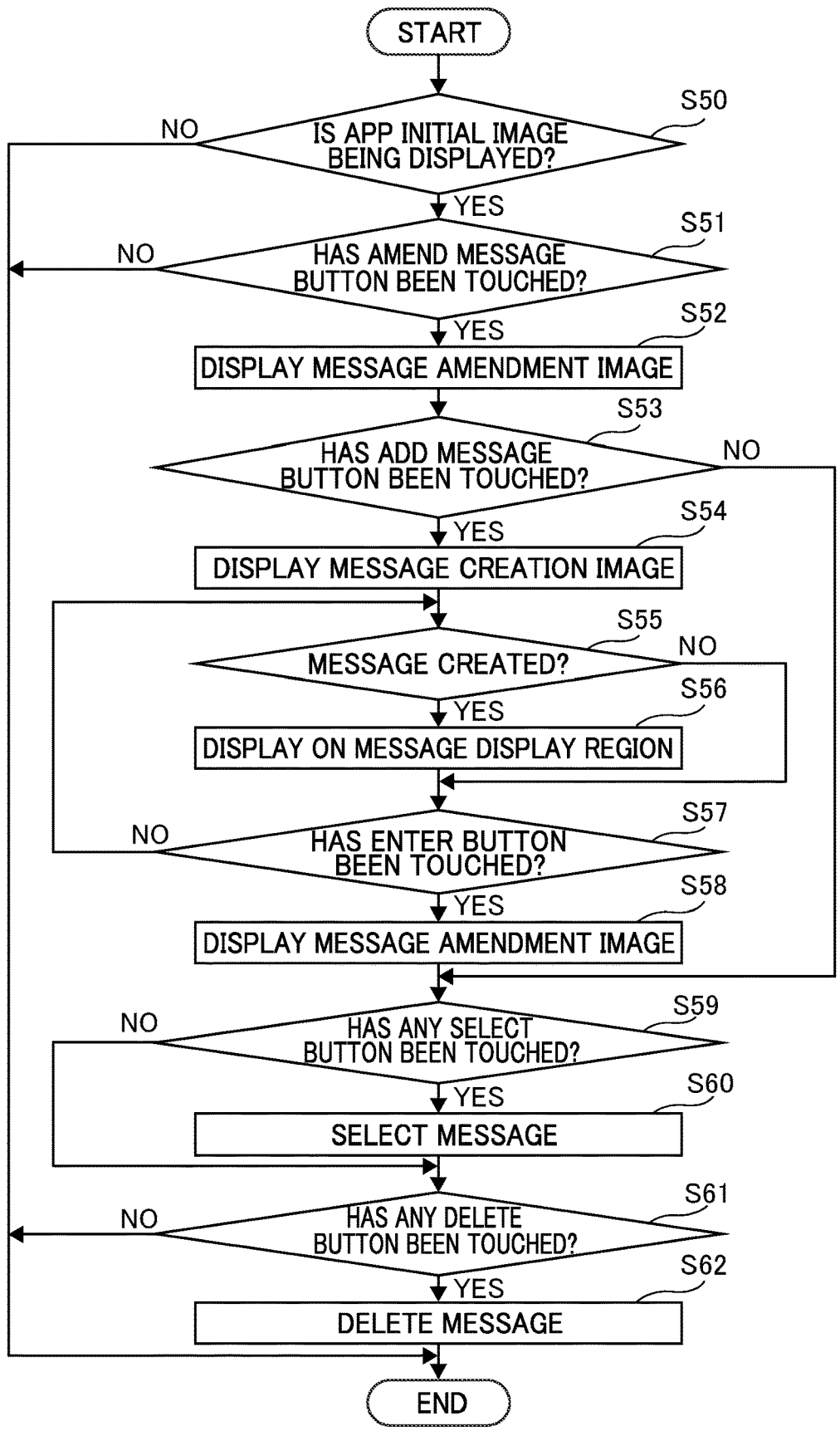
FIG. 19 is a flowchart illustrating processing executed by an ECU.

The ECU 21 also periodically executes the processing of the flowchart in FIG. 19 whenever a predetermined duration has elapsed.

At step S50, the notification processing section 216 of the ECU 21 determines whether or not the notification application has been activated and the app initial image 22MI illustrated in FIG. 6 is being displayed on the display 22.

In a case in which affirmative determination is made at step S50 the ECU 21 proceeds to step S51, whereupon the notification processing section 216 determines whether or not a touch operation has been performed on the amend message button 22-2MI.

In a case in which affirmative determination is made at step S51 the ECU 21 proceeds to step S52, whereupon the display control section 211 displays the message amendment image 22MR illustrated in FIG. 7 on the display 22. The message amendment image 22MR includes the first message 22MS-1, the second message 22MS-2, the third message 22MS-3, three select buttons 22SL, three delete buttons 22DT, and an add message button 22AD.

After finishing the processing of step S52 the ECU 21 proceeds to step S53, whereupon the notification processing section 216 determines whether or not a touch operation has been performed on the add message button 22AD.

Figure 8:
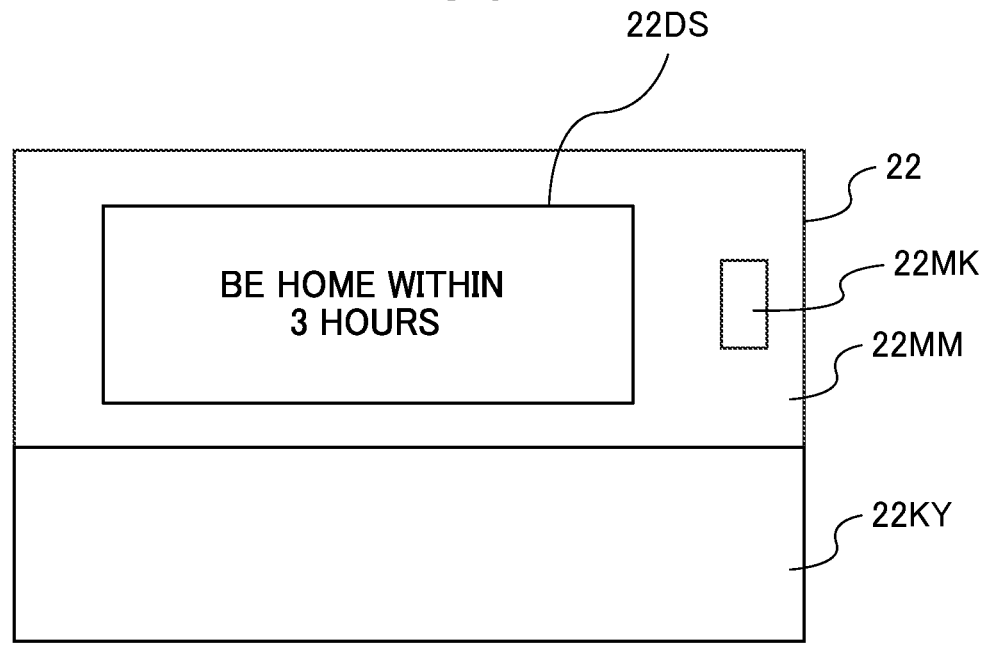
FIG. 8 is a diagram illustrating a display when an add message button has been touch-operated.

In a case in which affirmative determination is made at step S53 the ECU 21 proceeds to step S54, whereupon the display control section 211 displays a message creation image 22MM illustrated in FIG. 8 on the display 22. The message creation image 22MM includes a keyboard 22KY, a message display region 22DS, and an enter button 22MK.

After finishing the processing of step S54 the ECU 21 proceeds to step S55, whereupon the notification processing section 216 determines whether or not a touch operation has been performed on at least one out of plural text images (not illustrated in the drawings) included in the keyboard 22KY. These text images may for example include the alphabet. Namely, the notification processing section 216 determines whether or not an occupant has created a new message using the keyboard 22KY.

In a case in which affirmative determination is made at step S55 the ECU 21 proceeds to step S56, whereupon the display control section 211 displays the text input using the keyboard 22KY on the message display region 22DS.

After finishing the processing of step S56 the ECU 21 proceeds to step S57, whereupon the notification processing section 216 determines whether or not a touch operation has been performed on the enter button 22MK. In a case in which a negative determination is made at step S57, the ECU 21 repeats the processing of step S55.

For example, in a case in which a new message such as "We'll be home within 3 hours" has been input using the keyboard 22KY as illustrated in FIG. 8, after which affirmative determination is made at step S57, the notification processing section 216 records the created new message in the storage 21D. The ECU 21 then proceeds to step S58.

Figure 9:
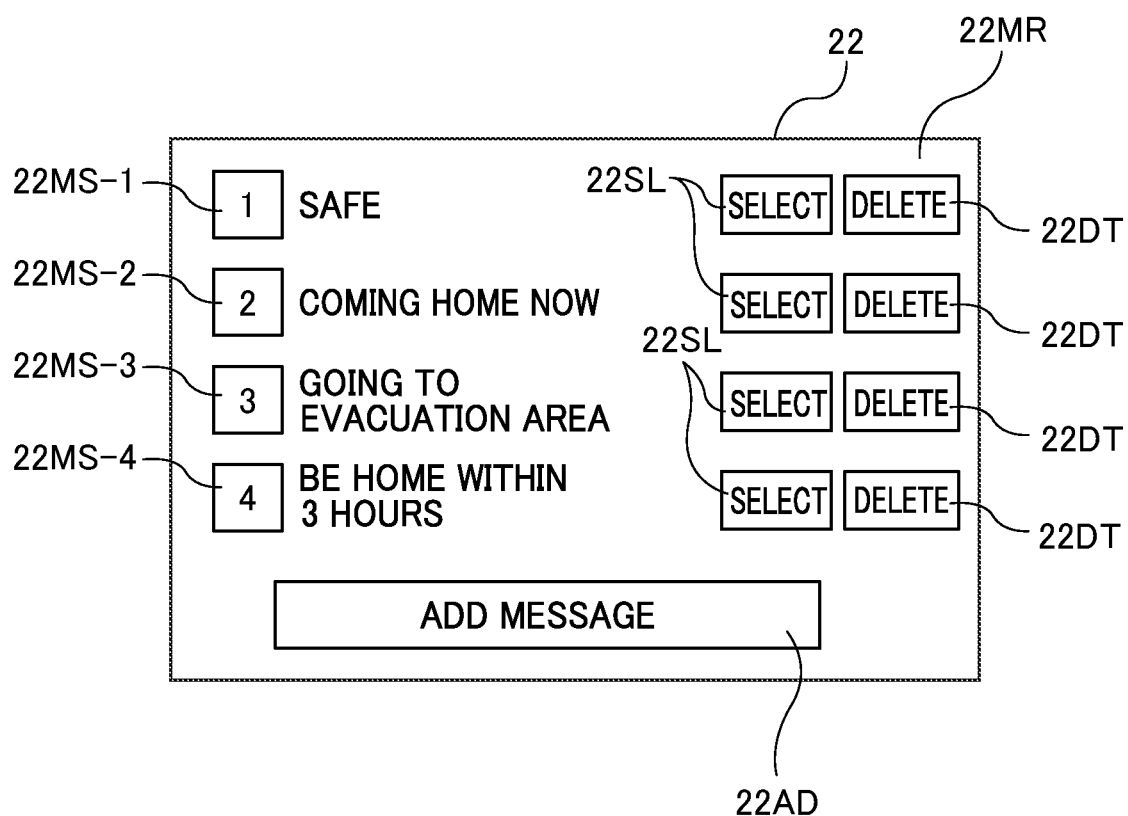
FIG. 9 is a diagram illustrating a display when an enter button has been touch-operated.

At step S58, the display control section 211 displays a message amendment image 22MR illustrated in FIG. 9 on the display 22. This message amendment image 22MR includes a fourth message 22MS-4 depicting the message created at step S55, in addition to a select button 22SL and a delete button 22DT corresponding to the fourth message 22MS-4.

After finishing the processing of step S58 the ECU 21 proceeds to step S59, whereupon the notification processing section 216 determines whether or not a touch operation has been performed on any of the select buttons 22SL.

For example, in a case in which a touch operation has been performed on the select button 22SL corresponding to the fourth message 22MS-4, the ECU 21 makes affirmative determination at step S59 and proceeds to step S60. In such cases, the notification processing section 216 selects (registers) the fourth message as the transmission target message instead of the first message.

After finishing the processing of step S60 the ECU 21 proceeds to step S61, whereupon the notification processing section 216 determines whether or not a touch operation has been performed on any of the delete buttons 22DT.

In a case in which affirmative determination is made at step S61 the ECU 21 proceeds to step S62, whereupon the notification processing section 216 deletes the message (first message 22MS-1, second message 22MS-2, third message 22MS-3, or fourth message 22MS-4) corresponding to the delete button 22DT that was touch-operated from the storage 21D.

After finishing the processing of step S62 or in a case in which a negative determination is made at step S50 or S51, the ECU 21 ends this round of the processing of the flowchart in FIG. 19.

Thus, in a case in which for example the fourth message has been selected as the transmission target message, after which the processing of step S32 or step S44 is executed, the wireless communication I/F 21E wirelessly transmits the fourth message together with the email to the corresponding communication terminals 50.

Figure 20:
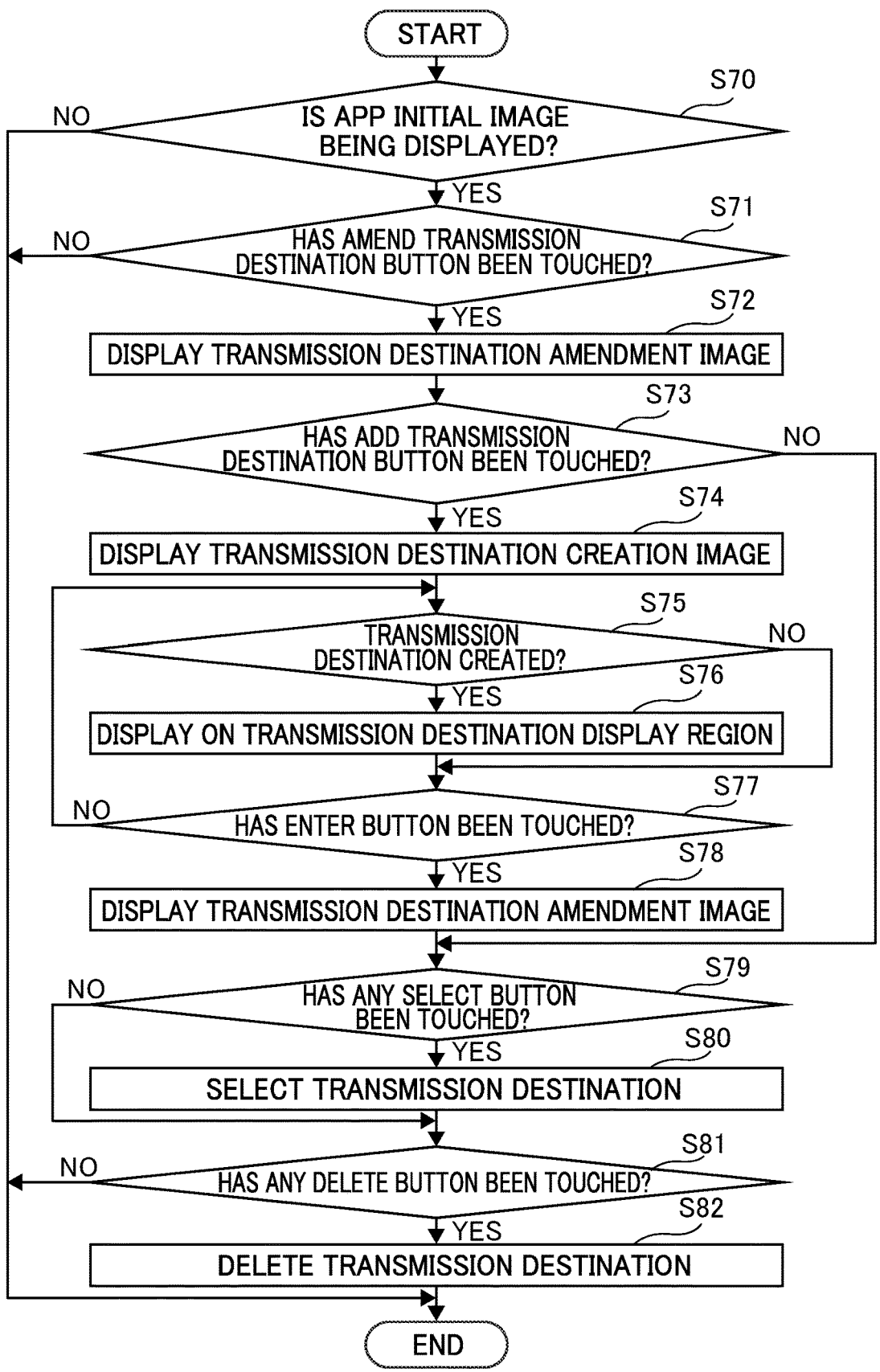
FIG. 20 is a flowchart illustrating processing executed by an ECU.

The ECU 21 also periodically executes the processing of the flowchart in FIG. 20 whenever a predetermined duration has elapsed.

At step S70, the information recognition section 215 of the ECU 21 executes the same processing as at step S50.

In a case in which affirmative determination is made at step S70 the ECU 21 proceeds to step S71, whereupon the notification processing section 216 determines whether or not a touch operation has been performed on the amend transmission destination button 22-3MI illustrated in FIG. 6.

In a case in which affirmative determination is made at step S71 the ECU 21 proceeds to step S72, whereupon the display control section 211 displays a transmission destination amendment image 22SD illustrated in FIG. 10 on the display 22. The transmission destination amendment image 22SD includes the first transmission destination information 22DR-1, the second transmission destination information 22DR-2, the third transmission destination information 22DR-3, three select buttons 22SL, three delete buttons 22DT, and an add transmission destination button 22AS. The first transmission destination information 22DR-1, the second transmission destination information 22DR-2, and the third transmission destination information 22DR-3 each include information relating to a name and an email address.

After finishing the processing of step S72 the ECU 21 proceeds to step S73, whereupon the notification processing section 216 determines whether or not a touch operation has been performed on the add transmission destination button 22AS.

Figure 11:
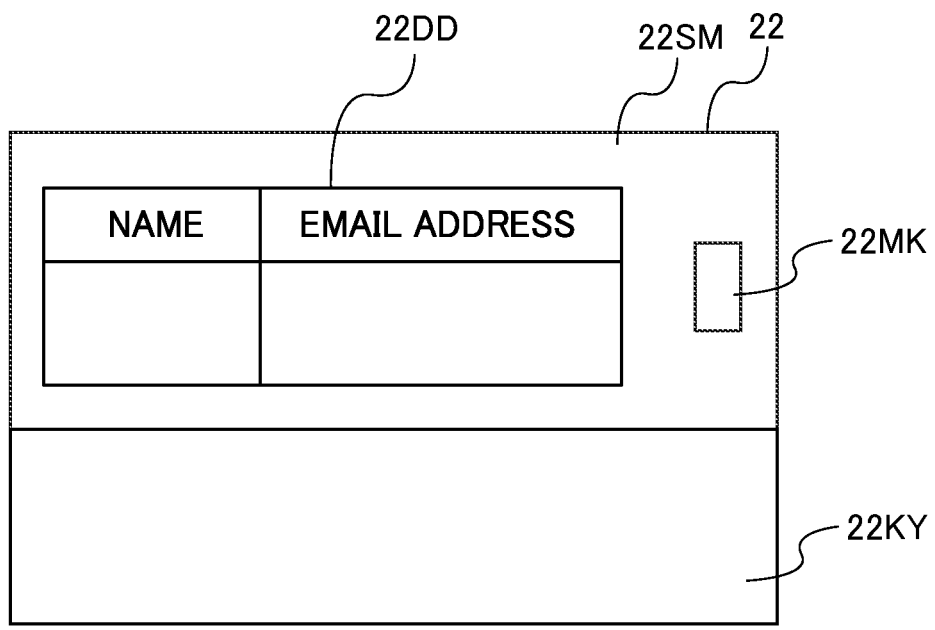
FIG. 11 is a diagram illustrating a display when an add transmission destination button has been touch-operated.

In a case in which affirmative determination is made at step S73 the ECU 21 proceeds to step S74, whereupon the display control section 211 displays a transmission destination creation image 22SM illustrated in FIG. 11 on the display 22. The transmission destination creation image 22SM includes a keyboard 22KY, a transmission destination display region 22DD, and an enter button 22MK.

After finishing the processing of step S74 the ECU 21 proceeds to step S75, whereupon the notification processing section 216 determines whether or not a touch operation has been performed on at least one out of plural text images included in the keyboard 22KY. Namely, the notification processing section 216 determines whether or not an occupant has created new transmission destination information using the keyboard 22KY.

In a case in which affirmative determination is made at step S75 the ECU 21 proceeds to step S76, whereupon the display control section 211 displays the text input using the keyboard 22KY on the transmission destination display region 22DD.

After finishing the processing of step S76 the ECU 21 proceeds to step S77, whereupon the notification processing section 216 determines whether or not a touch operation has been performed on the enter button 22MK. In a case in which a negative determination is made at step S77, the ECU 21 repeats the processing of step S75.

For example, in a case in which a new transmission destination information has been input using the keyboard 22KY as illustrated in FIG. 11, after which affirmative determination is made at step S77, the notification processing section 216 records the created new transmission destination information in the storage 21D. The ECU 21 then proceeds to step S78.

At step S78, the display control section 211 displays a transmission destination amendment image 22SD illustrated in FIG. 12 on the display 22. This transmission destination amendment image 22SD includes fourth transmission destination information 22DR-4 depicting the transmission destination information created at step S75, in addition to a select button 22SL and a delete button 22DT corresponding to the fourth transmission destination information 22DR-4.

After finishing the processing of step S78 the ECU 21 proceeds to step S79, whereupon the notification processing section 216 determines whether or not a touch operation has been performed on any of the select buttons 22SL.

For example, in a case in which a touch operation has been performed on the select button 22SL corresponding to the fourth transmission destination information 22DR-4, the ECU 21 makes affirmative determination at step S79 and proceeds to step S80. In such cases, the notification processing section 216 selects (registers) the fourth transmission destination information 22DR-4 as the target transmission destination information in addition to the first transmission destination information 22DR-1.

After finishing the processing of step S80 the ECU 21 proceeds to step S81, whereupon the notification processing section 216 determines whether or not a touch operation has been performed on any of the delete buttons 22DT.

In a case in which affirmative determination is made at step S81 the ECU 21 proceeds to step S82, whereupon the notification processing section 216 deletes the transmission destination information (first transmission destination information 22DR-1, second transmission destination information 22DR-2, third transmission destination information 22DR-3, or fourth transmission destination information 22DR-4) corresponding to the delete button 22DT that was touch-operated from the storage 21D.

After finishing the processing of step S82 or in a case in which a negative determination is made at step S70 or S71, the ECU 21 ends this round of the processing of the flowchart in FIG. 20.

Thus, in a case in which for example the fourth transmission destination information 22DR-4 has been selected as the target transmission destination information in addition to the first transmission destination information 22DR-1, after which the processing of step S32 or step S44 is executed, the wireless communication I/F 21E under the control of the notification processing section 216 wirelessly transmits the corresponding message together with the email to the two communication terminals 50 corresponding to the first transmission destination information 22DR-1 and the fourth transmission destination information 22DR-4.

As described above, in the present exemplary embodiment, the ECU 21 controls the wireless communication I/F 21E so as to notify the corresponding communication terminals 50 based on an instruction made to the ECU 21 by an occupant through the display 22 (transmit message button 22-1MI), or on disaster information received from the external server 30 by the wireless communication I/F 21E. Thus, even in a case in which the occupants of the vehicle 20 do not possess a mobile terminal, the occupants are able to notify the communication terminals 50 of a message indicating their safety by using the wireless communication I/F 21E of the vehicle 20. A person viewing their communication terminal 50 is thereby able to ascertain safety information regarding the occupants of the vehicle 20.

Furthermore, after activating the notification application, an occupant of the vehicle 20 can cause the wireless communication I/F 21E to transmit a message by performing a touch operation on the transmit message button 22-1MI displayed on the display 22. Namely, the occupant can cause the wireless communication I/F 21E to transmit a message by performing a simple operation.

Furthermore, the occupant of the vehicle 20 can also cause the wireless communication I/F 21E to transmit a message by moving the switch 29a provided to the steering wheel 29 from the initial position to the operation position. The occupant is therefore able to cause the wireless communication I/F 21E to transmit a message by performing a simple operation while performing driving operations of the vehicle 20. Furthermore, even in a state in which the notification application is not activated, the occupant can cause the wireless communication I/F 21E to transmit a message by moving the switch 29a to the operation position.

Furthermore, the position information for the vehicle 20 is transmitted from the vehicle 20 to the corresponding communication terminals 50 together with the message for notifying the communication terminals 50. A person viewing their communication terminal 50 is thereby able to ascertain the current position of the vehicle 20.

Furthermore, the travel-capability information is transmitted from the vehicle 20 to the corresponding communication terminals 50 together with the message for notifying the communication terminals 50. A person viewing their communication terminal 50 is thereby able to ascertain whether or not the vehicle 20 (its tires 27A) is in a state capable of travel.

Furthermore, the vehicle interior image data and vehicle exterior image data is transmitted from the vehicle 20 to the corresponding communication terminals 50 together with the message for notifying the communication terminals 50. A person viewing their communication terminal 50 is thereby able to ascertain the conditions of the occupants of the vehicle 20. The person viewing their communication terminal 50 is also able to ascertain the conditions outside the vehicle. For example, this person is able to ascertain the weather outside the vehicle 20 and the state of the road surface of the road where the vehicle 20 is positioned.

Furthermore, in a case in which the ECU 21 has determined that all of the occupants have exited the vehicle based on the detection results of the first camera 24, and the wireless communication I/F 21E has received disaster information from the external server 30 indicating a disaster with a disaster rank of rank 3 or above, the wireless communication I/F 21E notifies the corresponding communication terminals 50 without consulting the occupants. Thus, for example, even in a case in which the occupants are incapable of making rational decisions after a disaster has occurred and have not executed an operation on the display 22 or the switch 29a, the wireless communication I/F 21E notifies the corresponding communication terminals 50 when all the occupants have moved out of the vehicle. There is accordingly a high likelihood of the corresponding communication terminals 50 being notified by the vehicle 20, even in a case in which the occupants are incapable of making rational decisions.

Furthermore, the wireless communication I/F 21E only notifies the corresponding communication terminals 50 in a case in which the wireless communication I/F 21E has received disaster information from the external server 30 indicating a disaster with a disaster rank of 3 or above. In other words, the wireless communication I/F 21E does not notify the corresponding communication terminals 50 in a case in which the wireless communication I/F 21E has received disaster information from the external server 30 indicating a disaster with a disaster rank of less than rank 3. Thus, the wireless communication I/F 21E does not notify the communication terminals 50 without consulting the occupants in a case in which a minor natural event that has less of a need for notification has occurred.

Although a wireless communication system, a wireless communication method, and a program according to an exemplary embodiment have been described above, various design modifications may be implemented with respect to the wireless communication system, the wireless communication method, and the program as appropriate within a range not departing from the spirit of the present disclosure.

A communication terminal 50 may be any device that is capable of wireless communication with the vehicle 20. For example, a tablet computer or a personal computer may be employed as a communication terminal 50.

The vehicle 20 may notify the corresponding communication terminals 50 using a communication means other than email. For example, the vehicle 20 may notify the communication terminals 50 using a social networking service (SNS) or a short message service (SMS).

Configuration may be such that the information included in the notification that the vehicle 20 makes to the corresponding communication terminals 50 includes only some information out of the above-described message, position information for the vehicle 20, travel-capability information, vehicle interior image data, or vehicle exterior image data. Alternatively, configuration may be such that the information included in the notification includes different information than the above-described message, position information for the vehicle 20, travel-capability information, vehicle interior image data, and vehicle exterior image data.

Configuration may be such that the sensor provided to the vehicle 20 is at least one sensor out of the first camera 24, the second camera 25, or the air pressure sensors 28. For example, the vehicle 20 may include only one camera out of the first camera 24 or the second camera 25. Alternatively, the vehicle 20 may include a different sensor than the first camera 24, the second camera 25, and the air pressure sensors 28.

Configuration may be such that the ECU 21 determines whether or not there are any occupants present inside the vehicle based on detection results of a motion sensor (detection device) provided to the vehicle 20.

Configuration may be such that the processing of step S21 of the flowchart in FIG. 16 is processing in which the speaker control section 212 outputs the disaster information and the disaster rank as audio through the speaker 23.

Furthermore, the vehicle 20 may be equipped with a speech recognition device (operation device). In such cases, an occupant issues a vocal instruction to cause the wireless communication I/F 21E to perform notification. In such cases, the speech recognition device recognizes the vocal instruction, and the recognized instruction content is transmitted from the speech recognition device to the ECU 21.

Configuration may be such that the ECU 21 of the vehicle 20 includes the same functionality as the rank determination section 302. In such cases, the ECU 21 determines the disaster rank bases on the disaster information received from the external server 30 and on the rank determination map 31 recorded in the ROM 21B or the storage 21D of the ECU 21.

Configuration may be such that the vehicle 20 does not include one out of the notification application or the switch 29a.

Configuration may be such that the switch 29a is provided to a different location of the vehicle 20 than the steering wheel 29. For example, the switch 29a may be provided to the instrument panel.

Configuration may be such that the vehicle 20 includes a receiver that is capable of receiving information from satellites of a global navigation satellite system other than GPS (such as Galileo) instead of the GPS receiver 26.

What is claimed is:

1. A wireless communication system comprising:
   a memory;
   a wireless communication unit provided at a vehicle and that wirelessly communicates with an external communication device positioned externally of the vehicle;
   a detection device provided at the vehicle and that detects whether any occupant is present inside the vehicle; and
   a processor provided at the vehicle and that is coupled to the memory and to the detection device, the processor being configured to:
   (i) cause the wireless communication unit to transmit a notification to a communication terminal positioned externally of the vehicle based on an instruction received from the occupant of the vehicle, and
   (ii) cause the wireless communication unit to transmit the notification to the communication terminal positioned externally of the vehicle when the processor has determined that there is no occupant in the vehicle based on a detection result of the detection device and when disaster information has been received by the wireless communication unit from the external communication device.

2. The wireless communication system of claim 1, wherein the processor is configured to cause the wireless communication unit to transmit the notification to the communication terminal in a case in which a disaster rank of a disaster indicated by the disaster information transmitted by the external communication device to the wireless communication unit is a predetermined rank or above.

3. The wireless communication system of claim 1, further comprising at least one sensor provided at the vehicle,
   wherein the processor is configured to cause the wireless communication unit to transmit sensor information acquired by the sensor to the communication terminal as part of the notification transmitted to the communication terminal.

4. The wireless communication system of claim 3, wherein the sensor includes an air pressure sensor configured to detect an air pressure of a tire of the vehicle.

5. The wireless communication system of claim 3, wherein the sensor includes a camera that images at least one imaging subject out of an imaging subject positioned inside the vehicle or an imaging subject positioned externally of the vehicle.

6. The wireless communication system of claim 1, wherein the vehicle includes an operation device enabling the occupant to input information indicating the instruction.

7. The wireless communication system of claim 6, wherein:
the operation device is a switch provided at a steering wheel of the vehicle; and
the processor is configured to control the wireless communication unit to transmit the notification to the communication terminal in a case in which the switch has been operated.

8. The wireless communication system of claim 1, wherein the detection device is a camera.

9. The wireless communication system of claim 1, wherein the detection device is a motion sensor.

10. A wireless communication method, comprising, by a processor provided at a vehicle:
(i) causing a wireless communication unit provided at the vehicle to transmit a notification to a communication terminal positioned externally of the vehicle based on an instruction received from an occupant of the vehicle, and
(ii) causing the wireless communication unit to transmit the notification to the communication terminal positioned externally of the vehicle when the following conditions (a) and (b) are both satisfied:
 (a) the processor has determined that there is no occupant in the vehicle based on a detection result of a detection device provided at the vehicle and that detects whether any occupant is present inside the vehicle, and
 (b) when disaster information has been received by the wireless communication unit from an external communication device positioned externally of the vehicle.

11. A non-transitory computer-readable medium storing a program executable by a processor provided at a vehicle to execute processing comprising:
(i) causing a wireless communication unit provided at the vehicle to transmit a notification to a communication terminal positioned externally of the vehicle based on an instruction received from an occupant of the vehicle, and
(ii) causing the wireless communication unit to transmit the notification to the communication terminal positioned externally of the vehicle when the following conditions (a) and (b) are both satisfied:
 (a) the processor has determined that there is no occupant in the vehicle based on a detection result of a detection device provided at the vehicle and that detects whether any occupant is present inside the vehicle, and
 (b) when disaster information has been received by the wireless communication unit from an external communication device positioned externally of the vehicle.

\* \* \* \* \*